United States Patent
Dufour et al.

(10) Patent No.: US 9,114,463 B2
(45) Date of Patent: *Aug. 25, 2015

(54) ANTIROTATION TOOL HOLDER AND CUTTING INSERT

(75) Inventors: Jean-Luc Dufour, Franklin, TN (US); X. Daniel Fang, Brentwood, TN (US); David J. Wills, Franklin, TN (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/398,968

(22) Filed: Feb. 17, 2012

(65) Prior Publication Data

US 2012/0163929 A1    Jun. 28, 2012

Related U.S. Application Data

(63) Continuation of application No. 12/967,514, filed on Dec. 14, 2010, now Pat. No. 8,147,171.

(51) Int. Cl.
*B23C 5/22* (2006.01)
*B23C 5/06* (2006.01)
*B23C 5/02* (2006.01)

(52) U.S. Cl.
CPC ............... *B23C 5/2221* (2013.01); *B23C 5/06* (2013.01); *B23C 2200/045* (2013.01); *B23C 2200/125* (2013.01); *B23C 2200/164* (2013.01); *B23C 2200/168* (2013.01); *B23C 2210/168* (2013.01); *Y10T 407/1924* (2015.01); *Y10T 407/22* (2015.01)

(58) Field of Classification Search
CPC .................................. B23C 5/06; B23C 5/2221
USPC .................. 407/40, 49, 108, 66, 67, 113, 114
See application file for complete search history.

(56) References Cited

U.S. PATENT DOCUMENTS

| | | | |
|---|---|---|---|
| 4,679,968 A * | 7/1987 | Tsujimura et al. | 407/114 |
| 5,536,119 A * | 7/1996 | Werner et al. | 407/36 |
| 6,053,671 A * | 4/2000 | Stedt et al. | 407/35 |
| 6,164,878 A * | 12/2000 | Satran et al. | 407/113 |
| 6,234,724 B1 * | 5/2001 | Satran et al. | 407/43 |
| 6,238,133 B1 * | 5/2001 | DeRoche et al. | 403/359.1 |
| 6,948,889 B2 * | 9/2005 | Arvidsson | 407/35 |
| 7,390,149 B2 * | 6/2008 | Wihlborg | 407/35 |
| 7,722,297 B2 * | 5/2010 | Dufour et al. | 407/66 |
| 7,908,945 B2 * | 3/2011 | Dufour et al. | 82/1.11 |
| 8,807,884 B2 * | 8/2014 | Fang et al. | 407/66 |
| 2006/0269374 A1 * | 11/2006 | Dufour et al. | 409/132 |

* cited by examiner

*Primary Examiner* — Will Fridie, Jr.
(74) *Attorney, Agent, or Firm* — Larry R. Meenan

(57) ABSTRACT

The present invention relates to embodiments of a cutting tool holder having at least one insert pocket, wherein at least one insert pocket comprises a side surface and at least one antirotation stop protruding from the side surface.

31 Claims, 9 Drawing Sheets

ANTIROTATION TOOL HOLDER AND CUTTING INSERT

CROSS-REFERENCE TO RELATED APPLICATIONS

This application is a continuation of application Ser. No. 12/967,514, filed Dec. 14, 2010, which issued as U.S. Pat. No. 8,147,171 on Apr. 3, 2012, which is a continuation of application Ser. No. 10/533,277, filed on Jul. 6, 2006, which issued as U.S. Pat. No. 7,908,945 on Mar. 22, 2011, which is a National Stage Entry of International Application No. PCT/US04/06377, filed on Mar. 2, 2004.

TECHNICAL FIELD AND INDUSTRIAL APPLICABILITY OF THE INVENTION

The present invention relates to material cutting tools. The present invention more particularly relates to tool holders and cutting inserts. The tool holder and cutting inserts of the present invention comprise an antirotation stop to prevent rotation of the insert while secured in an insert pocket of the tool holder.

BACKGROUND OF THE INVENTION

Early carbide cutting tools were typically carbide blanks brazed to steel holders. The blank would be resharpened by grinding. Clearance angles, cutting point radii, and other features could also be ground into the tools to suit a particular cutting operation. Although these early carbide cutting tools provide significant productivity increases over previous tools, certain disadvantages became apparent. Regrinding to sharpen the dulled tool would change the size and shape of the cutting insert. This would require an adjustment of the relationship between the cutting tool and the workpiece each time the tool is sharpened to compensate for the smaller sized tool.

Additionally, the brazed connection between the carbide insert and the holder could only withstand a limited range of operating temperature, thereby reducing the number of potential applications for the carbide tool. Additionally, carbide inserts which with coated surfaces could not be resharpened and had to be replaced.

Presently, replaceable, indexable inserts are more widely used. Indexable inserts resemble brazed tools except that the carbide insert is secured in the holder by clamping rather than brazing. When a cutting edge dulls, the insert may be removed, rotated, and replaced to provide a new sharp edge for further cutting. This eliminated the need for readjustment of the cutting operation between changes. Typically, an indexable cutting insert is held in place by a screw with a tapered head that fits a conical hole in the insert and thus holds the insert securely in the tool holder. Clamps on top of the insert may also be used in conjunction with the screw to further secure the cutting insert to the tool holder.

Consistency and ease of replacement are the main advantages of indexable inserts. Consistency of positioning of the cutting edge from index to index simplifies machine tool setup and helps ensure a more uniform product.

There may be a number of problems, however, in using a round shape inserts in a tool holder for metal machining, in particular in milling operations. Typical problems for machining with round inserts include inconsistent insert life in machining operations due to an imprecise indexing mechanism compared to square or diamond shape inserts, insecure clamping and positioning of a round inserts since no straight edge is available for indexing, cutting edge chipping may also result from rotation of a round shape insert in the pocket of the cutting tool holder, as well as other reasons.

Several tool holders and round cutting inserts have incorporated antirotation mechanisms in an attempt to overcome these problems in machining metals with round shape inserts in tool holders. For example, U.S. Pat. No. 5,658,100, describes a mechanism to secure the round shape insert in a pocket of a milling cutter wherein a plurality of depressions are built on the top surface of the round shape insert. The insert is then secured in the tool holder by a clamping claw supported on the milling cutter body, to prevent the rotation of a round shape insert in the pocket of a milling cutter. However, since the clamping claw described in U.S. Pat. No. 5,658,100 engages the top face of the cutting insert, the chip control geometry must perform the duel function of preventing rotation and to controlling the chip formation of the insert in operation.

In U.S. Pat. No. 6,053,671, a round shape insert is manufactured in a way that the edge surface of the insert consists of two portions separated by a step. The upper portion is a conical frustum which functions as a normal round cutting surface and the lower portion is in the shape of a polygon which creates an interface contact with the lower wall of the pocket, thus preventing the rotation of a round shape insert against the pocket.

In U.S. Pat. No. 5,346,336, another cutting insert comprising a polygonal pattern of facets is described. The polygonal pattern is located around the circular side surface of a round shape insert and then a complementary shaped polygonal pattern of the pocket is provided. The polygonal facet on a round shape insert interfaces with the complementary polygonal wall on the corresponding pocket of a milling cutter body, thus preventing the rotation of a round shape insert in the pocket.

U.S. Pat. Nos. 6,053,671 and 5,346,336 are basically similar in design, that is, the polygonal-shaped facets on a round shape insert interacts with the complementarily-shaped polygonal wall in the receiving pocket on a milling cutter body. The edges of the full radius formed by the polygonal pattern on the hard carbide material insert may slowly cut the relatively soft steel material of the pocket pin during the machining operations. In addition, the limited contact provided by the polygonal pattern-based design of these inserts may result in one-point contact between the edges of the insert facets and the flat wall of the pocket, which can result in localized chipping or cracking of the insert over time.

In U.S. Pat. No. 6,238,133, a insert and tool holder are described wherein a plurality of curved and obliquely 3-dimensional surfaces are built around the side wall of a round shape insert which interfaces with a substantially complementary curved surface, also 3-dimensional, in the insert-receiving pocket of a milling cutter body, therefore providing an anti-rotation mechanism for a round shape insert in the pocket on a milling cutter.

U.S. Pat. No. 6,238,133 provides a mechanism that uses curved stop surfaces around the side wall of the round shape insert and at least one complementary anti-rotation curved surface in the pocket of a cutter body. Both curved surfaces are defined by partial radius curves such that the interface can be in a form of either a broad/line-type contact or double convex, lenticular, contact. This is largely because there are no sharp edges on the insert to weaken the contact interface between the hard carbide insert and the relatively soft pocket on a steel cutter body.

There are several disadvantages and limitations in the mechanism described in U.S. Pat. No. 6,238,133, these disadvantages are primarily due to the complexity of the curved and oblique 3-dimensional surfaces in the pocket. Specifically, first, the complementarily-shaped oblique geometry can require complex machining procedures in the manufacturing of the insert and the corresponding pocket to ensure the necessary geometric and dimensional accuracy required to keep the desired functionality at the contact interface between the insert and the pocket. Second, the curved and oblique 3-dimensional surface limits the manufacturing methods for the pocket to an axial machining method along the pocket axis. Third, as a result of the manufacturing limitations of the complex geometry of the tool holder, it further limits number of pockets, thus the number of teeth, in a milling cutter.

The number of teeth on a milling cutter is an important factor affecting the cutting efficiency of the milling operation. A milling cutter should have enough teeth to ensure uninterrupted contact with the work piece. If the milling cutter has too few teeth, one tooth will lose contact with the workpiece prior to the next tooth is engaging the workplace. This will lead to vibration and chatter resulting in poor finishing, dimensional inaccuracies, and excessive tool wear. The quality of the surface finish is typically better using milling cutters with more teeth.

Although all the above-mentioned mechanisms provide feasible means of preventing undesired rotation of a round shape insert in the corresponding pocket on a milling cutter body, the mechanisms described all have some shortcomings.

Therefore, there is a need for an indexable cutting insert and tool holder that effectively functions to prevent rotation of the round shape insert in an insert pocket, but also are easy to manufacture and provides the necessary accuracy for stable and secure positioning. There is also a need for an indexable cutting insert, for example, a cutting insert made from tungsten based carbide or cermet and tool holder combination that allows the possibility to increase number of teeth on a cutter body.

SUMMARY OF THE INVENTION

The present invention relates to embodiments of a cutting tool holder having at least one insert pocket, wherein at least one insert pocket comprises a side surface and at least one antirotation stop protruding from the side surface. The antirotation stop may comprise at least two substantially planar surfaces. In certain embodiments, the cutting tool holder may have a pocket which comprises a bottom surface and an antirotation stop having three substantially planar surfaces that are substantially perpendicular to the bottom surface.

The antirotation stop may be integral to the tool holder or may be produced separately and attached, either permanently or temporarily, to the tool holder. Embodiments may further comprise additional antirotation stops if desired by the machining application.

In one embodiment, the cutting tool holder includes an insert pocket in the tool holder and at least one antirotation stop protruding from at least one of a side wall and the bottom surface of the insert pocket, wherein the antirotation stop comprises at least two substantially planar surfaces. A cutting insert made of tungsten based carbide or cermet may be secured in the tool holder, wherein the cutting insert has a recess having a shape that is non-complementary to the shape of the antirotation stop.

The cutting insert may be manufactured using a tangential machining method. The method includes tangentially machining at least one antirotation stop and an insert pocket in the tool holder, wherein the antirotation stop comprises at least two substantially planar surfaces. The method may further comprise milling a top surface of the pocket with a ball mill. The tangential method allows forming more pockets per a diameter of the tool holder than an axial machining method.

DESCRIPTION OF EMBODIMENTS OF THE INVENTION

Embodiments of the tool holder includes at least one insert pocket. Each insert pocket comprises a bottom surface and a side surface, and at least one antirotation stop protruding from the bottom surface, wherein the antirotation stop comprises at least two substantially planar surfaces. The tool holder may be used for any machining operation such as, but not limited to, milling, turning, boring, planing, shaping, and reaming.

Figure 1:
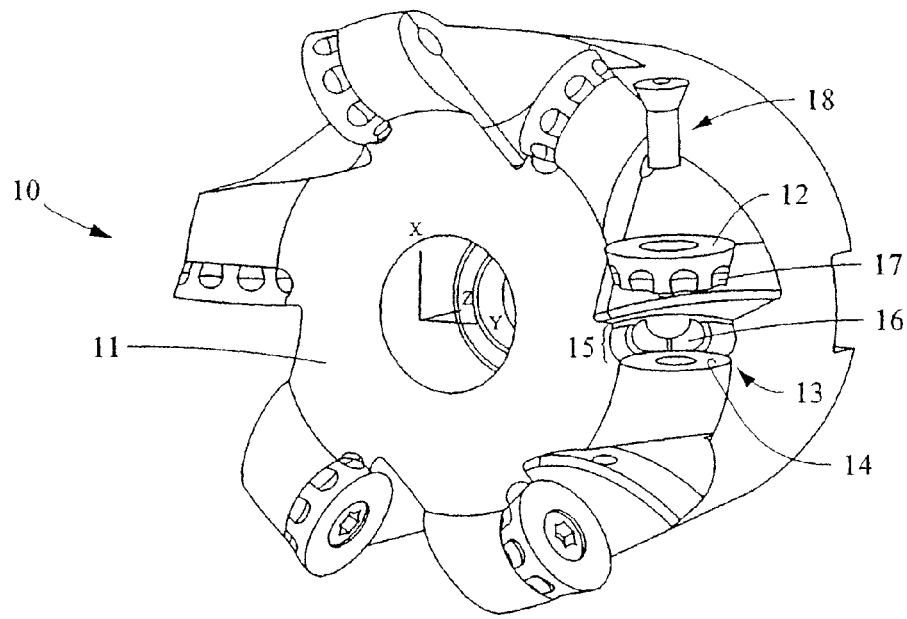
FIG. 1 is a perspective view of an embodiment of the tool holder as a milling cutter having six pockets incorporating an antirotation stop having at least two substantially planar surfaces.

An embodiment of the tool holder may be a milling cutter tool 10 for an indexable cutting insert, such as shown in FIG. 1. The embodiment of the tool holder in FIG. 1 includes a tool body 11 having six (6) pockets 13 for receiving six (6) indexable round shaped cutting inserts 12. The round shaped cutting inserts 12 may be secured in pockets 13. The pocket 13 of this embodiment of the tool holder comprises a bottom surface 14 and a side wall 15. An antirotation stop 16 protrudes from the side wall 15. The antirotation stop 16 at least partially extends into a recess 17 in the indexable cutting insert 12 preventing rotation of the cutting insert 12 after the cutting insert is secured to the tool holder 10 by a screw 18.

The tool body 12 may be formed from any suitable engineering material such as a metal, alloy, plastic, or ceramic used in the fabrication of machinery, machinery components, structural shapes, tools, instruments, and other items. Their hardness, strength, machinability, dimensional stability, non-flammability, and resistance to corrosion, acids, solvents, and heat may characterize the properties of such suitable engineering materials. One example of a list of such suitable engineering materials include, but are not limited to, metals and alloys such as aluminum, beryllium, brass, bronze, cast iron, copper, lead, magnesium, steel, tantalum, zinc, zirconium, and various other trademarked and non-trademarked alloys; ceramics such as glass and porcelain; and plastics such as ABS resin, acetal resin, acrylic resin, fluorocarbon polymer, nylon, phenolformaldehyde resin, polybutilene terephthalate, polycarbonate, polyethylene, polyphenylene oxide, polypropylene, polystyrene, polyvinyl chloride, reinforced plastics (FRP), and ureaformaldehyde resin.

The tool holder of the present invention comprises at least one pocket. A pocket in a tool holder is designed to receive a cutting insert. In certain embodiments, such as shown in FIG. 1, the pocket 13 has a bottom surface 14 and a side wall 15. The bottom surface 14 supports a cutting insert while in the tool holder. The side wall 15 may also engage the cutting insert to further support the insert during milling, or other machining, operation.

Figure 2C:
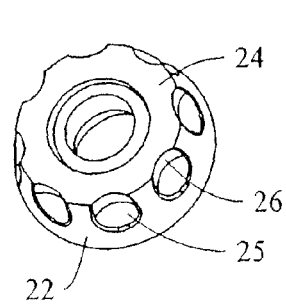
FIGS. 2A, 2B, and 2C are perspective views of a round shaped cutting insert compatible with the tool holder of FIG. 1, wherein the insert has eight recesses for indexing the insert in the tool holder.
Figure 2B:
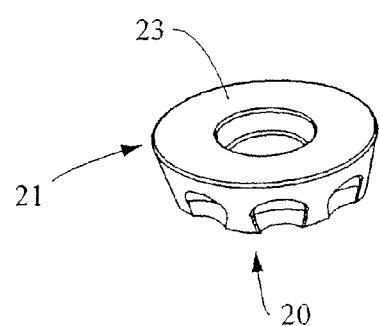
Figure 2A:
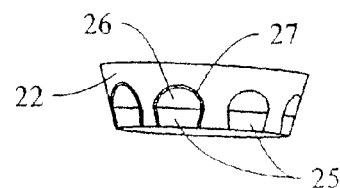

Embodiments of the tool holder further comprise an antirotation stop. The antirotation stop prevents rotation of the insert within the pocket of the tool holder. A cutting insert comprising at least one recess may be secured in the pocket with the antirotation stop extending into the recess of the cutting insert. A round shape insert 20, as shown in FIGS. 2A, 2B and 2C, includes a cutting edge 21, side wall 22, top chip breaker geometry 23, bottom face 24, and multiple recessed surfaces 25 around the side wall 22 of the insert 22. The edge 27 of the recessed surface 26 of the insert may be smoothly blended to form a radius. Typically, a round shape insert is positioned, and then fastened, into a pocket built on a milling tool holder. See FIG. 1. The antirotation step corresponds with at least one of the insert pockets in the tool holder. Therefore, the antirotation step may be incorporated in the insert pocket or on the insert itself. A recess which corresponds to the antirotation step is incorporated in the other of the insert and the insert pocket.

The phrase substantially planar indicates that the surfaces are flat or level. The surfaces of the antirotation step should be considered substantially planar if the surfaces are manufactured in such a way to maintain the engagement of the antirotation step and the recess at a point, or a localized section, contact. As used herein, point or point contact is defined as a contact between two components that is limited to a localized area.

The tool holder of the present invention does not require a complementarily shaped antirotation stop as compared to the recess. This non-complementary requirement allows the pocket and insert to be more easily manufactured and more accurately secured than tool holders and inserts which are complementary. The antirotation stop in the pocket provided in the present invention has at least two substantially planar surfaces instead of the obliquely oriented 3-dimensional surface of the prior art, such as in the recent U.S. Pat. No. 6,238,133. Therefore it allows the manufacturing of the pockets using the tangential method rather than an axial method. A tangential method involves the forming the pocket of the cutting tool by approaching the pocket in a direction tangent to the pocket bottom surface rather than in an axial (conventional) direction of the pocket as is the case in the method of forming the pocket as described in the recent U.S. Pat. No. 6,238,133.

Figure 3:
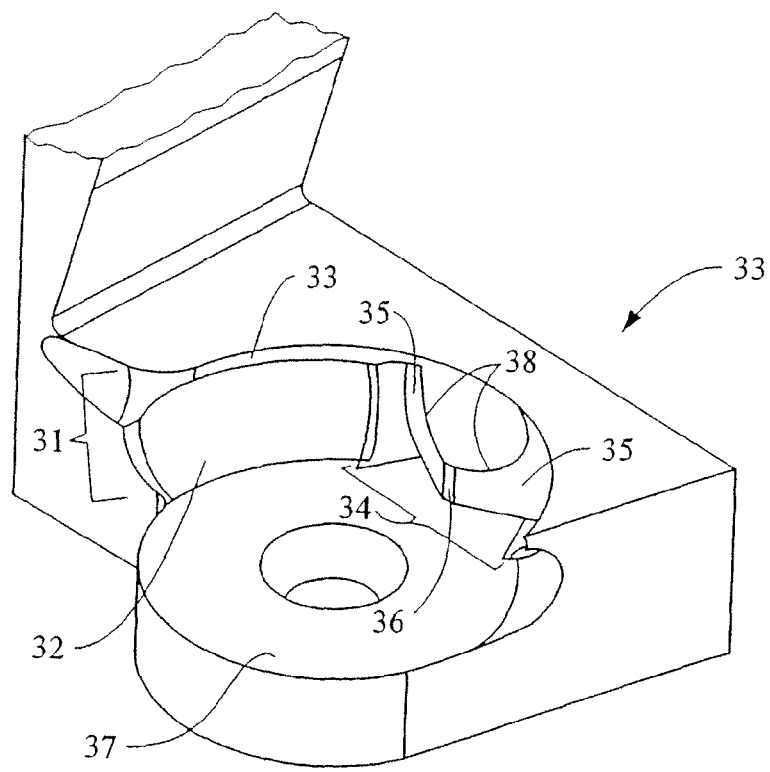
FIG. 3 is enlarged view of one pocket of the tool holder of FIG. 1.

In another embodiment, shown in FIG. 3, the tool holder comprises a pocket 33 including a side wall 31 comprising a pocket lower wall 32 and an upper wall 33, an antirotation stop 34 having two substantially planar surfaces 35, a center substantially planar face 36, and bottom surface 37. The optional upper wall 33 may be either curved or angled or a combination of both. The two substantially planar surfaces 35 and the center substantially planar face 36, in this embodiment, are perpendicular to the bottom face 37 of the pocket 33, thus, which can then be described as in the form of a non-oblique 2-dimensional geometry. Further since there is only one integrated antirotation stop combining three substantially planar faces in each pocket 33, both the maximum positioning accuracy and simplified manufacturing process may be achieved.

While the bottom surface 37 of the pocket 33 supports the insert during a cutting operation, the recessed surface, 26, or the edge 27 of the recess of the cutting insert 20, in FIGS. 2A-2C, are contacted by either of the edges 38 of the antirotation stop 34 to prevent rotation of the insert 20.

Figure 4A:
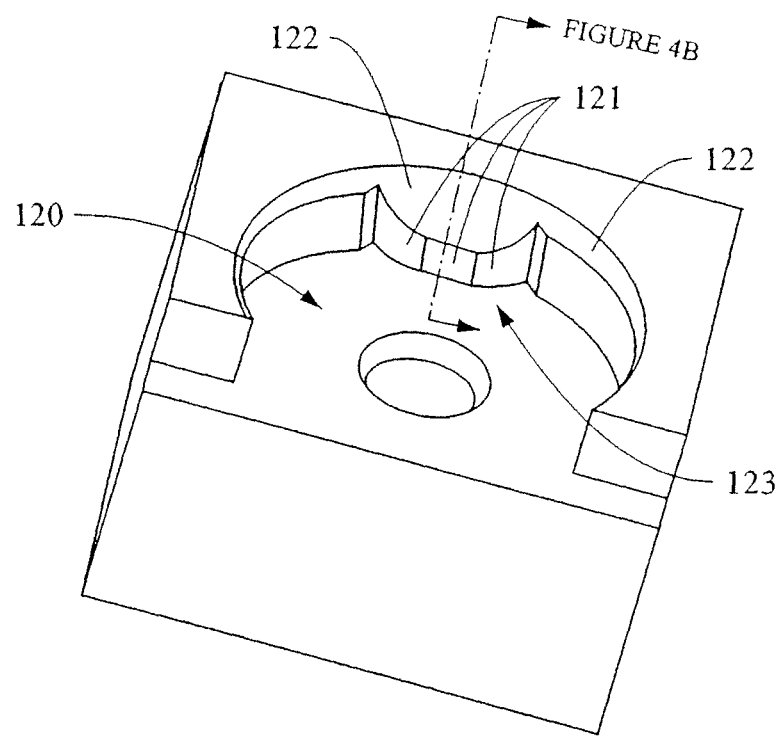
FIGS. 4A, 4B, 4C, 4D, 4E, 4F, 4G and 4H are perspective and cross-sectional views of different embodiments of antirotation stops of the present invention.
Figure 4B:
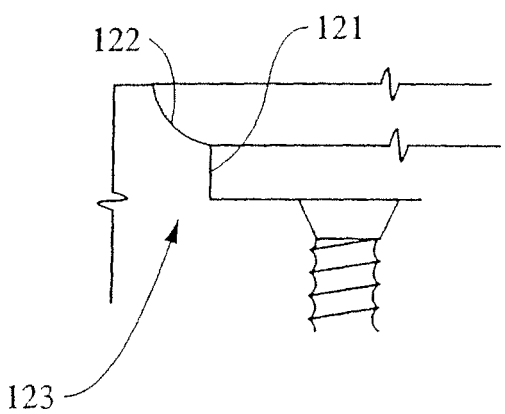
Figure 4D:
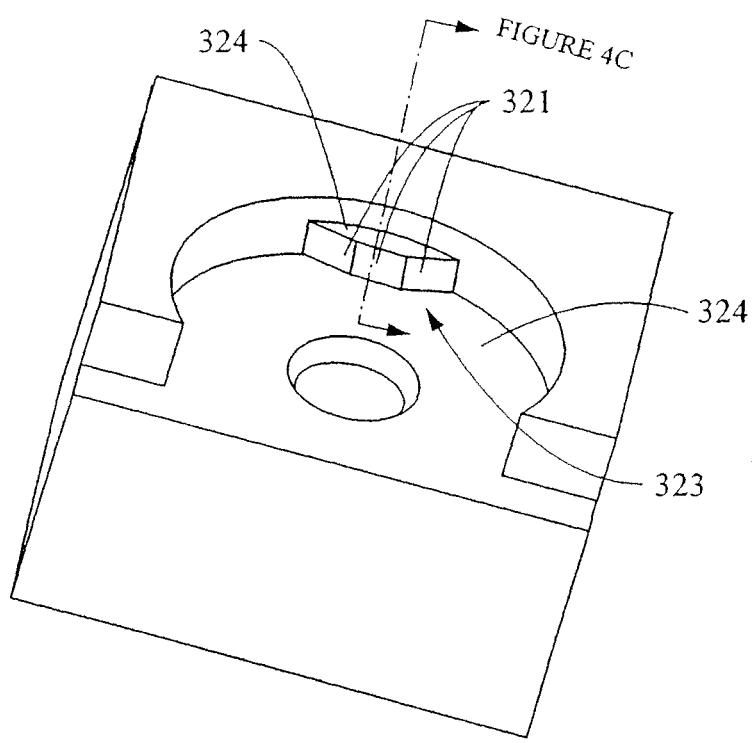
Figure 4C:
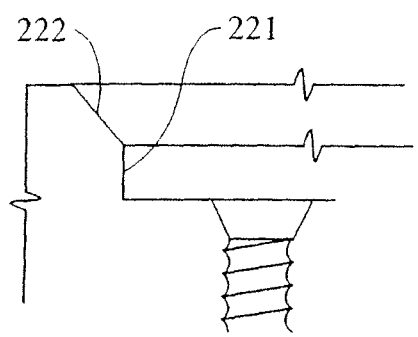
Figure 4E:
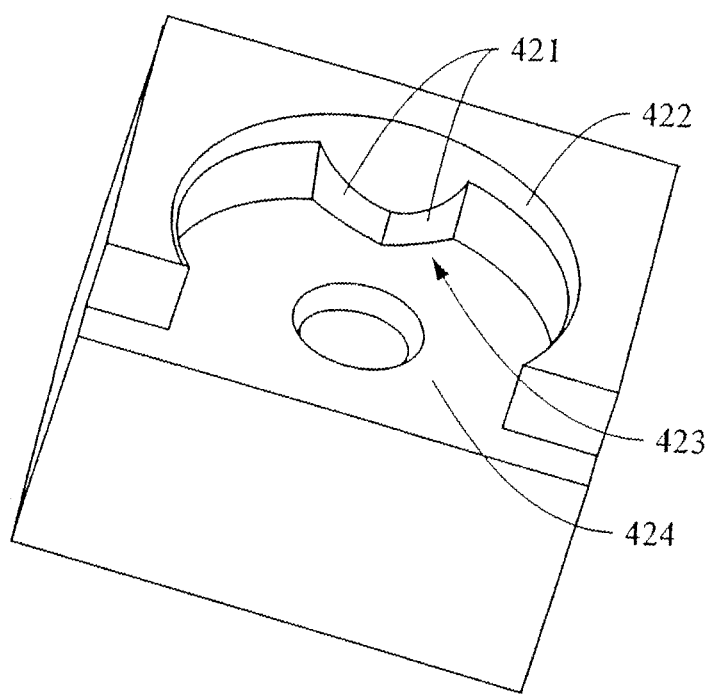
Figure 4F:
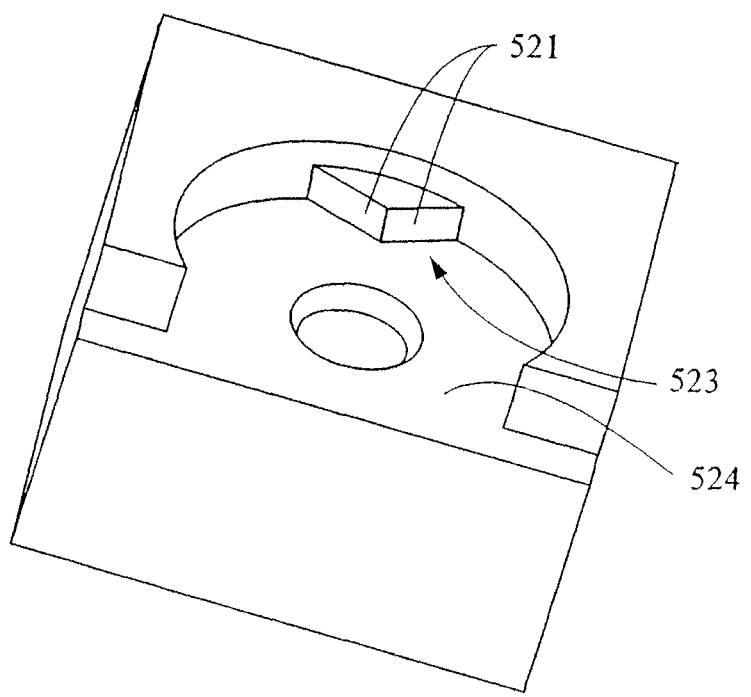

The antirotation stop need not be limited to the shape shown in FIG. 1 or 3. See FIGS. 4A, 4B, 4C, 4D, 4E, 4F, 4G and 4H. The antirotation stop comprises at least two planar surfaces and may comprise additional surfaces which may or may not be planar. The embodiment shown FIGS. 4A and 4B has the antirotation stop 123 has three planar surfaces 121 and a chamfer comprising a fourth curved surface 122. The three planar surfaces in the embodiment of FIGS. 4A and 4B are substantially perpendicular to the bottom surface 124. The curved surface, chamfer 122, in this embodiment has a circular cross-section. The chamfer 122, as shown in FIG. 2B, may be formed by milling the top of the antirotation stop with a standard ballnose endmill, see FIG. 6B. The chamfer may be any shape that allows at least a portion of the pocket to support an insert when it is secured in the tool holder. For example, a simple straight line chamfer 222, as shown in FIG. 4C may be used. The antirotation stop 323 as shown in FIG. 4D has four substantially planar surfaces, 321 and 324, without a chamfering of the top edge wherein surfaces 321 are substantially perpendicular to bottom surface 324. The embodiments of the tool holder in FIGS. 4E and 4F have antirotation stops, 423 and 523, comprising just two planar surfaces, 421 and 521, that are substantially perpendicular to the bottom surface, 424 and 524, on the antirotation stop 23. A chamfer 422 is included in the embodiment of FIG. 4E.

Figure 4G:
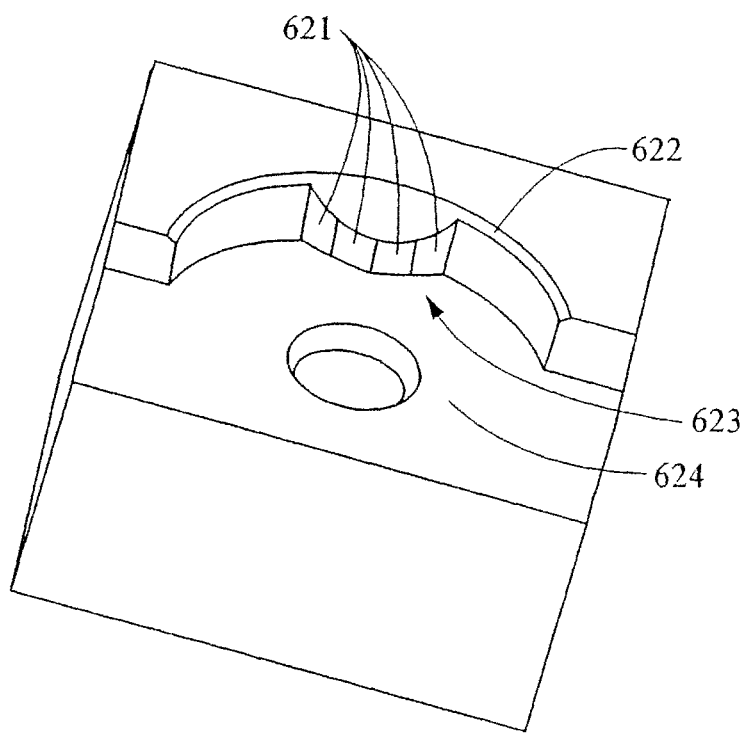
Figure 4H:
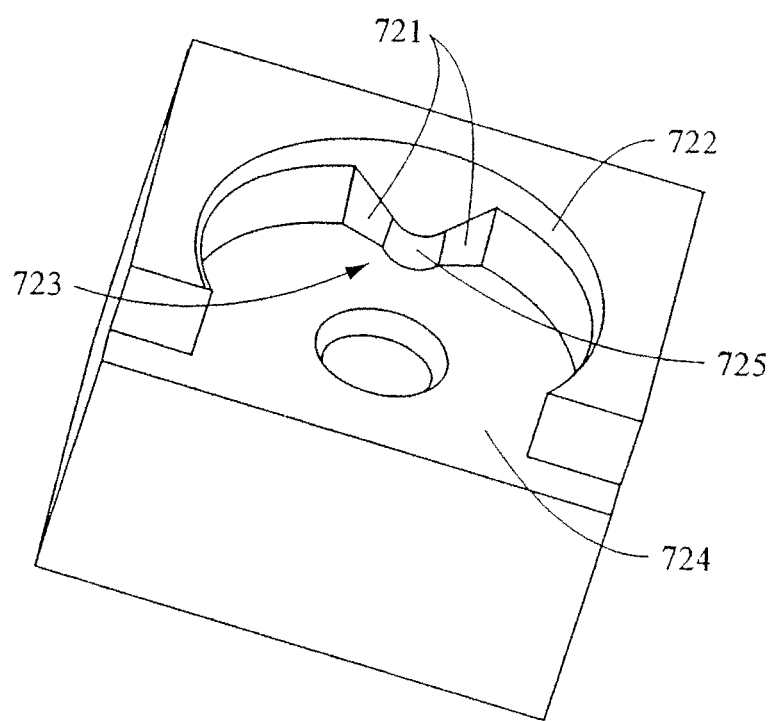

The embodiment of the tool holder in FIG. 4G comprises an antirotation stop 623 having four planar surfaces 621 that are substantially perpendicular to the bottom surface 624. While the embodiment of the tool holder in FIG. 4H comprises an antirotation stop 723 having two planar surfaces 721 perpendicular to the bottom surface 724 and a curved surface 725 that is also perpendicular to bottom surface 724. These embodiments of the tool holder are only examples of the various tool holders comprising antirotation stops and is not meant to limit the embodiments of the invention which may combine features of each the embodiments shown herein or other feature which may be derived from this description by one skilled in the art.

Embodiments of the present invention allows accurate and secure positioning a round shape insert in a tool holder. An accurately and securely positioned insert may improve the performance and consistency of the insert life. The tool holder of the present invention may be used with any number of shapes of cutting inserts. The shape of a recess in the cutting insert that engages the antirotation stop is not required to be complementary to the shape of the antirotation stop. In fact, a cutting insert comprising multiple recessed surfaces in any form may be used. A simple spherical geometry around the side wall of a round shape insert may be used with the tool holder.

Figure 5:
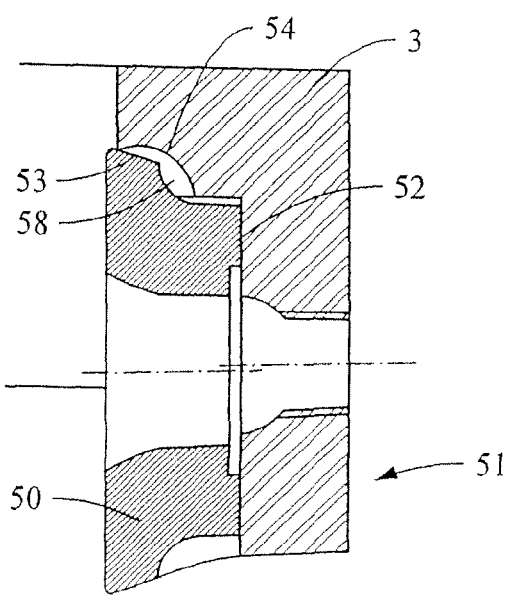
FIG. 5 is a cross-sectional view of a insert secured in an embodiment of the tool holder.

The insert contacts the pocket in at least three main two locations. As an example, an insert 50 may be seated in a pocket 51 as shown in FIG. 5. The bottom of the insert 50 contacts the bottom surface 52 of the pocket 51. Additionally, the upper portion of the side wall 53 of the insert 50 contacts the angled (as formed by a standard tapered end-mill in machining) or curved (as formed by a standard ball mill in machining) chamfer 54 at the upper portion of the pocket 51, which is, typically, the contact locations for round shape inserts. Additionally, in the embodiment of the tool holder of FIG. 5, there is contact between the insert 50 and the pocket 51 between the recessed surface 58 of the insert and either of the edges 38 of the pocket shown in FIG. 3. The advantage of having the contact at the concave profile of the edges 38 is that this form of contact provides more stability and less tendency for sliding between the insert and the tool holder during machining operations. The combined effect of the above contacts provides an effective and stable mechanism to prevent the rotation of the insert in the pocket. The edges 38 may be modified from the sharp corners to include a chamfer or rounding of the edge.

Embodiments of the tool holder of the present invention allow more accurate seating of the insert. A recessed surface of the insert contacts the pocket at a concave profile of the edge of the antirotation stop thus giving a stable contact. In one embodiment, the edge of the top of the antirotation stop is a result of the intersection between at least two substantially planar faces and a sphere formed by a standard ball mill when machining the upper portion of the pocket wall.

Embodiments of the tool holder provide significant advantages.

In this invention, the anti-rotation surface in the insert-receiving pocket consists of at least 2 substantially planar surfaces in a form of non-oblique 2-dimensional geometry, rather than the convex surfaces in a form of oblique 3-dimensional geometry as in U.S. Pat. No. 6,238,133.

In this invention, there need not be a complementary relationship between the positioning geometry of the insert and the pocket, rather than the complementarily shaped geometry in U.S. Pat. No. 6,238,133.

A regular round shape insert may contact at the upper portion of the pocket wall. For a round shape insert with anti-rotation mechanism, it needs to have at least one additional contact. In embodiments of the tool holder of the present invention, the insert contacts with the lower portion of the pocket wall at a point, rather than the linear contact of the pocket and tool insert described in U.S. Pat. No. 6,238,133. Therefore, tool holders of the present invention give a more stable contact, which improves the in-process performance and the seating consistency of the insert in the tool holder. In certain embodiments, the above-mentioned point contact result from the edge formed at the top the two substantially planar surfaces.

Because of the substantially planar geometry, this invention allows manufacturing of the pocket using the tangential method rather than the axial, or conventional, method. In the tangential method, the cutting tool approaches the pocket in a direction tangent, or parallel, to the pocket bottom face rather than in an axial direction perpendicular to the pocket bottom face as shall be in U.S. Pat. No. 6,238,133. Therefore, the design in this invention provides more options for ease of manufacturing.

It is a well-known that the conventional method, i.e. axial method, is typically used for manufacturing a pocket in a milling cutting tool. The tool used for manufacturing the pocket approaches and machines the pocket in a direction parallel to the axis of the pocket, thus the clearance space for the cutting tool must be provided along the pocket axis. In this sense, the axial method for manufacturing the pocket limits the number of pockets, or number of teeth, per diameter available for a milling cutter.

Figure 6B:
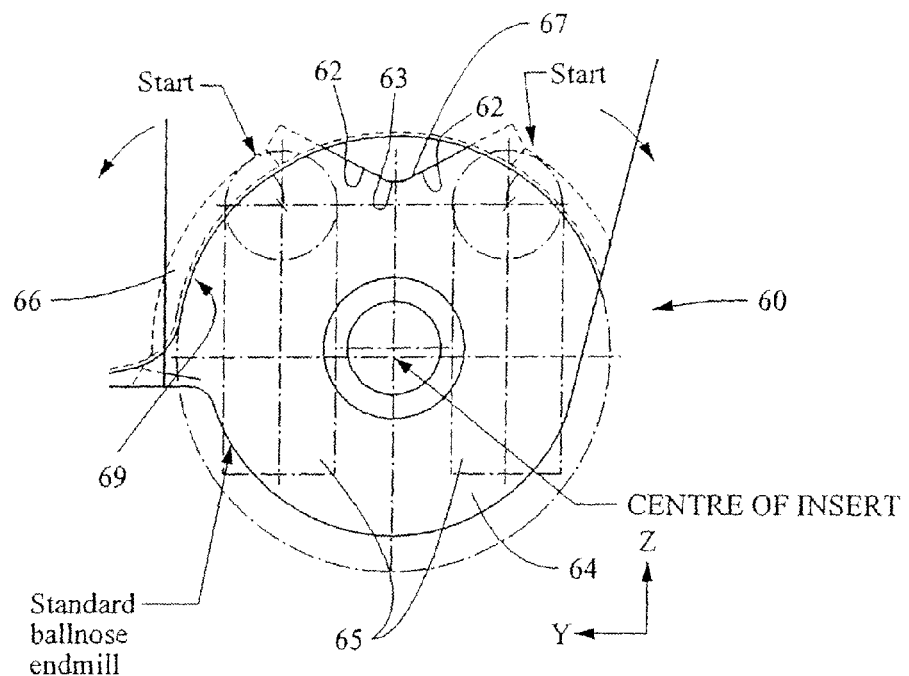
FIGS. 6A and 6B are plan views of an embodiment of the tool holder showing an embodiment of the tangential manufacturing method used to produce the pocket.
Figure 6A:
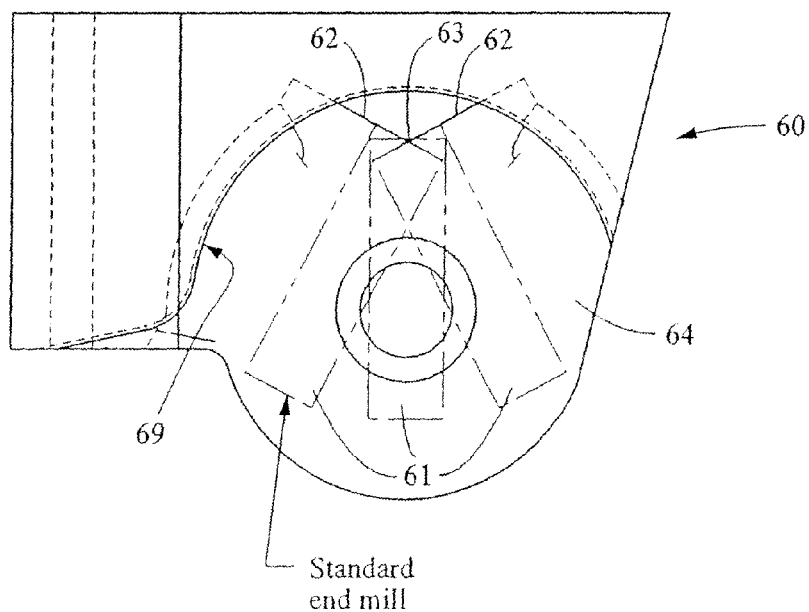

The tangential method for manufacturing the pocket is more flexible and one embodiment is shown in FIGS. 6A and 6B. As shown in FIG. 6A, a standard 90-degree end-mill 61 may approach the pocket in a direction parallel to the pocket bottom surface, or in other words, in a tangential direction to the pocket bottom face 64. In the embodiment shown in FIGS. 6A and 6B, a 90-degree end-mill opens the pocket 60 first, which machines the pocket side wall 69 for a rough cut, and at the same time machines the two substantially planar surfaces 62 and, optionally, a third substantially planar face 63. As shown in FIG. 6B, a standard ball mill 65 may machine, also tangentially, the upper portion 66 of the pocket side wall 69 which naturally forms a concave profile and an edge 67 at the intersection with the three substantially planar surfaces, 62 and 63.

The tangential manufacturing method allows more pockets or cutting teeth to be formed per diameter in a cutter body than an axial manufacturing method. Therefore, this invention can expand the machining applications.

There are several advantages in having the ability to produce tool holders with additional pockets. For instance, the life of the cutting inserts may be improved by reducing feed rates during machining while keeping or improving the material removal rate. A milling cutter with less distance between the teeth can also improve the life of cutter body by reducing the stresses distributed on each tooth. More teeth will also benefit in machining of some difficult-to-machine materials, like inconel, titanium, etc.

The recessed surface of the insert which may be, for example, tungsten based carbide or cermet in embodiments of the present invention may have a simple geometry, that is, an almost perpendicular, or preferably, slightly off perpendicular such as, 1 to 2 degrees perpendicular to the bottom surface and then smoothly extending to a simple spherical surface, rather than the complex geometry that is defined by partial curved radius and includes continuous sinusoidal curve around the insert circumference as well as tapered (about 15 degrees) curved stop surface at the central portion as in the prior art.

Embodiments of the tool holder have been described, however, different modifications, variations, and additions may become evident to persons of ordinary skill in the art. For example, while the anti-rotation stop has been described with respect to use on a tool holder in conjunction with a round insert, it may also may be incorporated into embodiments with other curved cutting edges or even straight cutting edges. In addition, the embodiments described herein comprise on antirotation stop, a greater number of antirotation stops may be incorporated into the tool holder comprising at least one antirotation stop comprising two planar surfaces.

Embodiments of the tool holder may be used to accurately and securely position a round shape insert, thus improving performance and consistency of the life of the insert in cutting operations. Embodiments of the tool holder are easy to manufacture due to the geometry of the pocket on the holder, and allow more number of pockets or teeth to be formed on a specific tool holder thus expanding the potential applications of the tool.

What is claimed is:

1. A cutting tool comprising:
   a tool holder including an insert pocket, wherein the insert pocket comprises a side wall comprising a pocket lower wall and an upper wall, the tool holder including only a single integral antirotation stop that extends into the insert pocket; and
   a round-shaped cutting insert disposed in the insert pocket, wherein the cutting insert includes a continuous cutting edge, and a recess,
   wherein the single antirotation stop comprises two substantially planar surfaces and a center substantially planar surface therebetween that are substantially perpendicular to a bottom surface of the insert pocket and at least partially extends into the recess and inhibits rotation of the cutting insert in the insert pocket in either direction by point contact within the recess between the single antirotation stop and the cutting insert.

2. The cutting tool of claim 1, wherein the tool holder includes at least two insert pockets, and each of the at least two insert pockets comprises a side wall including a single integral antirotation stop extending into the insert pocket.

3. The cutting tool of claim 2, wherein a cutting insert is secured in each of the at least two insert pockets of the tool holder.

4. The cutting tool of claim 1, wherein the cutting insert includes at least two recesses.

5. The cutting tool of claim 1, wherein the single antirotation stop of the insert pocket is integral to the bottom surface.

6. The cutting tool of claim 1, wherein the recess of the cutting insert is at least partially defined by a portion of a sphere.

7. The cutting tool of claim 4, wherein each of the at least two recesses of the cutting insert is at least partially defined by a portion of a sphere.

8. The cutting tool of claim 1, wherein the cutting tool is a milling tool and the cutting insert is a milling insert.

9. A cutting tool comprising:
a tool holder including an insert pocket, the insert pocket including a bottom surface and a side wall comprising a pocket lower wall and an upper wall, wherein the tool holder includes only a single integral antirotation stop that extends into the insert pocket and intersects the bottom surface; and
a round-shaped cutting insert disposed in the insert pocket, wherein the cutting insert includes a continuous cutting edge and a recess,
wherein the single antirotation stop comprises at least two substantially planar surfaces and a top surface formed by a chamfer having a circular cross-section that at least partially extend into the recess, and wherein rotation of the cutting insert in the insert pocket in a first direction is inhibited by point contact within the recess between the single antirotation stop and the cutting insert, and wherein rotation of the cutting insert in the insert pocket in a second direction is inhibited by point contact within the recess between the single antirotation stop and the cutting insert.

10. The cutting tool of claim 9, wherein the tool holder includes at least two insert pockets, and each of the at least two insert pockets comprises a side wall including a single integral antirotation stop extending into the insert pocket.

11. The cutting tool of claim 9, wherein a cutting insert is secured in each of the at least two insert pockets of the tool holder.

12. The cutting tool of claim 11, wherein the cutting insert includes at least two recesses.

13. The cutting tool of claim 9, wherein the antirotation stop indexes the cutting insert.

14. The cutting tool of claim 9, wherein the recess of the cutting insert is at least partially defined by a portion of a sphere.

15. The cutting tool of claim 9, wherein each of the at least two recesses of the cutting insert is at least partially defined by a portion of a sphere.

16. The cutting tool of claim 9, wherein the cutting tool is a milling tool and the cutting insert is a milling insert.

17. A cutting tool comprising:
a tool holder including an insert pocket, wherein the insert pocket comprises a side wall including only a single integral antirotation stop comprising at least three substantially planar surfaces that are substantially perpendicular to a bottom surface of the insert pocket and a top surface formed by a chamfer with a circular cross-section; and
a cutting insert disposed in the insert pocket, wherein the cutting insert is a round-shaped cutting insert including a continuous cutting edge and a recess,
wherein each of the three substantially planar surfaces and the top surface of the single antirotation element at least partially extend into the recess of the cutting insert to inhibit rotation of the cutting insert in the insert pocket in either direction by localized contact between one of the three surfaces of the single antirotation stop and the cutting insert.

18. The cutting tool of claim 17, wherein the tool holder includes at least two insert pockets, and each of the at least two insert pockets comprises a single antirotation stop.

19. The cutting tool of claim 18, wherein a cutting insert is secured in each of the at least two insert pockets of the tool holder.

20. The cutting tool of claim 17, wherein the cutting insert includes at least two recesses.

21. The cutting tool of claim 17, wherein the antirotation stop indexes the cutting insert.

22. The cutting tool of claim 17, wherein the recess of the cutting insert is at least partially defined by a portion of a sphere.

23. The cutting tool of claim 22, wherein each of the at least two recesses of the cutting insert is at least partially defined by a portion of a sphere.

24. A cutting tool comprising:
a tool holder including an insert pocket, the insert pocket including a bottom surface and a side wall, wherein the side wall includes only a single antirotation stop comprising at least three substantially planar surfaces that are substantially perpendicular to the bottom surface of the insert pocket, the single antirotation stop extending into the insert pocket and intersecting the bottom surface; and
a cutting insert disposed in the insert pocket, wherein the cutting insert is a round-shaped cutting insert including a continuous cutting edge and a recess,
wherein each of the three surfaces of the single antirotation stop of the insert pocket at least partially extend into the recess, and wherein rotation of the cutting insert in the insert pocket in a first direction is inhibited by contact within the recess between a localized area of one of the three surfaces of the single antirotation stop and the cutting insert, and wherein rotation of the cutting insert in the insert pocket in a second direction is inhibited by contact within the recess between a localized area of another one of three surfaces of the single antirotation stop and the cutting insert.

25. The cutting tool of claim 24, wherein the tool holder includes at least two insert pockets, and each of the at least two insert pockets comprises a side wall including a single integral antirotation stop extending into the insert pocket and including two surfaces.

26. The cutting tool of claim 25, wherein a cutting insert is secured in each of the at least two insert pockets of the tool holder.

27. The cutting tool of claim 24, wherein the cutting insert includes at least two recesses.

28. The cutting tool of claim 24, wherein the antirotation stop indexes the cutting insert.

29. The cutting tool of claim 24, wherein the recess of the cutting insert is at least partially defined by a portion of a sphere.

30. The cutting tool of claim 27, wherein each of the at least two recesses of the cutting insert is at least partially defined by a portion of a sphere.

31. The cutting tool of claim 24, wherein the cutting tool is a milling tool and the cutting insert is a milling insert.

\* \* \* \* \*